(12) United States Patent
Wood

(10) Patent No.: US 7,100,180 B2
(45) Date of Patent: Aug. 29, 2006

(54) CD BUSINESS CARD WITH CONTAINER AND/OR ADAPTER

(75) Inventor: David B. Wood, Centreville, VA (US)

(73) Assignee: Serious IP, Inc., New York, NY (US)

( * ) Notice: Subject to any disclaimer, the term of this patent is extended or adjusted under 35 U.S.C. 154(b) by 0 days.

(21) Appl. No.: 10/775,556

(22) Filed: Feb. 11, 2004

(65) Prior Publication Data

US 2004/0226032 A1    Nov. 11, 2004

Related U.S. Application Data

(63) Continuation of application No. 10/106,857, filed on Mar. 27, 2002, now Pat. No. 6,762,988, which is a continuation of application No. 09/170,040, filed on Oct. 13, 1998, now Pat. No. 6,510,124.

(60) Provisional application No. 60/062,408, filed on Oct. 14, 1997.

(51) Int. Cl.
G11B 23/03    (2006.01)

(52) U.S. Cl. ................... 720/720

(58) Field of Classification Search ........... 720/720, 720/745
See application file for complete search history.

(56) References Cited

U.S. PATENT DOCUMENTS

| | | | | |
|---|---|---|---|---|
| 1,121,239 | A | * | 12/1914 | Fuller ................ 206/310 |
| 3,232,423 | A | | 2/1966 | Smiler ................ 206/312 |
| 4,700,840 | A | * | 10/1987 | Haddock .............. 206/449 |
| 4,812,633 | A | * | 3/1989 | Vogelgesang et al. ... 235/487 |
| 4,837,784 | A | | 6/1989 | Yamamori ............. 720/720 |
| 4,868,373 | A | * | 9/1989 | Opheij et al. ......... 235/380 |
| 4,889,330 | A | | 12/1989 | McSwain .............. 269/95 |
| 4,928,271 | A | | 5/1990 | Verhagen ............. 309/292 |
| D316,088 | S | | 4/1991 | Yamamori ............. D14/484 |
| 5,088,599 | A | | 2/1992 | Mahler ............... 206/308.1 |
| 5,090,561 | A | | 2/1992 | Spector .............. 206/308.1 |

(Continued)

FOREIGN PATENT DOCUMENTS

DE    297 08 978 U1    8/1997

(Continued)

OTHER PUBLICATIONS

"THE CarD: Technical Specification", http://www.adivan.com/E/card_spec.html Aug. 28, 1998.

*Primary Examiner*—David Davis

(57) ABSTRACT

A CD Card for packaging card like information and digital information in the basic dimensions (length and width) of a business, credit or collectors card. The CD Card is made up of one, two, or three major components. The first component is a small compact disc with dimensions small enough to be contained within the typical dimensions (length and width) of a business card, credit card, or collectors card. The second component is a container shaped like a business, credit, or collectors card in length and width, but with a depth large enough to hold the small compact disc and adaptor (if required) discussed subsequently. The third component is an adaptor designed to position the small compact disc of the first and third embodiments of the present invention correctly in standard CD drives. A second embodiment of the small compact disc may not require an adaptor or case. The adaptor also has dimensions small enough to be contained within the typical dimensions (length and width) of a business card, credit card, or collectors card.

6 Claims, 6 Drawing Sheets

U.S. PATENT DOCUMENTS

| | | | |
|---|---|---|---|
| 5,096,064 A | 3/1992 | Rufo, Sr. et al. | 206/308.1 |
| 5,274,612 A * | 12/1993 | Sato et al. | 369/13.37 |
| 5,307,338 A | 4/1994 | Suzuki et al. | 720/618 |
| 5,457,677 A | 10/1995 | Yamashita et al. | 720/720 |
| 5,462,158 A | 10/1995 | Kramer | 206/307 |
| 5,475,656 A | 12/1995 | Sato et al. | 369/13.37 |
| 5,531,324 A | 7/1996 | Kosaki et al. | 206/449 |
| 5,844,757 A | 12/1998 | Rose | 360/131 |
| 5,882,555 A | 3/1999 | Rohde et al. | 264/1.33 |
| 5,982,736 A | 11/1999 | Pierson | 369/273 |
| D419,152 S | 1/2000 | Lowenstein | D14/478 |
| 6,016,298 A | 1/2000 | Fischer | 720/745 |
| D435,853 S | 1/2001 | Mehta et al. | D14/478 |
| D445,113 S | 7/2001 | Siegel | D14/474 |

FOREIGN PATENT DOCUMENTS

| | | |
|---|---|---|
| DE | M 97 02 996.8 | 9/1997 |
| DE | M 97 04 019.3 | 9/1997 |
| DE | 29709648 U | 12/1997 |
| EP | 0 331 389 A2 | 9/1989 |
| EP | 0 391 638 B1 | 4/1995 |
| GB | 2 239 974 | 7/1991 |
| JP | 560003471 | 1/1981 |
| JP | 04040586 | 2/1992 |
| NE | 9000256 | 9/1991 |

* cited by examiner

CD BUSINESS CARD WITH CONTAINER AND/OR ADAPTER

CROSS-REFERENCE TO RELATED APPLICATIONS

The present application is a Continuation of U.S. patent application Ser. No. 10/106,857 filed on Mar. 27, 2002, now U.S. Pat. No. 6,762,988 and incorporated herein by reference, which in turn is a Continuation of U.S. patent application Ser. No. 09/170,040, filed on Oct. 13, 1998, now U.S. Pat. No. 6,510,124 and incorporated herein by reference, which in turn claims priority from Provisional U.S. Application Ser. No. 60/062,408, filed Oct. 14, 1997, which is incorporated herein by reference.

FIELD OF THE INVENTION

The present invention relates to the field of compact disc (CD) data storage, specifically to a method and apparatus for packaging a smaller size compact disc, or a smaller size compact disc and disc adaptor into a credit card, business card, or baseball card/collectors card size.

BACKGROUND OF THE INVENTION

It may be desirable to be able to distribute digital information in a medium as widely accepted and easily carried as a business, credit, or collectors card that can be read or read and written to by a standard CD drive. For example, Spector, U.S. Pat. No. 5,090,561 discusses using a CD-ROM as a baseball collectable (Col. 2, lines 3–10) and provides a case for displaying such collectibles. However, a standard 12 cm CD-ROM is rather large and awkward compared to a standard baseball card, business card, or credit card size format.

It also may be desirable to change the shape of the small compact disc of the invention. It is known that a standard 12 cm in diameter compact disc can be cut (made) to have straight sides and play as a standard 12 cm diameter CD. Such a product is presently marketed under the trade name CyberTract™ and is commercially available through the American Tract Society and made with the cooperation of DISCART™, LLC, which claims copyright to the disc shapes and also claims patents pending.

One such tract, for example, has been marketed using the likeness of the late Mickey Mantle imprinted onto the face of the device. The device is encoded with text, graphics, and video of the late Mickey Mantle discussing his religious conversion. The overall appearance (but not size) of the device is akin to that of a baseball card or collectable, on one side.

The DISCART™ device, however, is made as a cut down (rectangular) version of a standard 12 cm compact disc (CD). This disc maintains the 12 cm diameter at four points to align itself in the CD drive. As a result, the packaged product is larger than a standard baseball card or sports collectable. Thus, products such as the DISCART™ device may not be as readily acceptable for collectors. Such an apparatus, for example, would not fit within standard baseball card holders, drawers, or shelving.

In addition, while the device appears to play satisfactorily in most CD players and CD-ROM drives, after testing the inventor has discovered that the device may create some vibrations or noise when played or used in some CD players or CD-ROM drives. The rectangular shape of the disc creates a slight imbalance or non-aerodynamic shape which may result in vibration in some CD players.

Another approach is a CD-ROM card marketed as "The CarD" by ADIVAN High Tech AG, Switzerland (www.adivan.com). The inventor is unaware of the first disclosure date of the ADIVAN device, and thus does not represent that the device qualifies as "prior art" per se. However, the device is disclosed herein under the spirit of the duty of disclosure.

The ADIVAN device is a CD-ROM provided in a number of shapes and sizes within a specified range. Four "knobs", spaced along a 75 mm diameter circle protrude from the underside of card, to align the card in a CD-ROM drive utilizing the 8 cm depressed portion of the CD-ROM drive tray. The presence of protruding knobs may make the card less useful as a business card device, as the resultant card is no longer flat. As such, storage devices for business cards, baseball cards, and the like, may not readily accept such a card. The knobs also make the card less aerodynamic and cause greater vibration. It would also appear to require a special mold to form the knobs.

One approach to solving such problems might be to use the 8 cm CD of the prior art. It is known that an 8 cm in diameter compact disc made by the Sony Corporation is commercially available. The 8 cm compact disc holds the same type of information that the 12 cm diameter disc can and is playable in standard CD drives. Such CD "singles" have heretofore been used mainly for music applications and the like. However, even an 8 cm CD is too large to fit in a standard baseball or business card size format.

Various adapters are known in the art for attaching to a 8 cm CD to adapt the 8 cm CD for playback on a 12 cm CD player, much as the old spindle adapters were used to play 45 RPM records on LP turntables. These adapters were designed when CD players did not incorporate an 8 cm aligning circle as they do today. Such adapters were also designed for use in compact disc cartridges (Caddys) which are very rare today. These adapters are still helpful today in playing 8 cm CDs in multi-disc cartridges and front loading players. 90 to 95% of CD players used today are tray loading drive types with 8 cm aligning circles, making these adapters unnecessary in the majority of CD players.

Yamamori, U.S. Pat. No. 4,837,784, issued Jun. 6, 1989, discloses one such device. It should be noted that it appears that the device of Yamamori engages the smaller 8 cm disc, thus forming a package which is 12 cm in diameter. Although the device of Yamamori may be suitable for playing back 8 cm discs, the overall structure of the apparatus suffers from some drawbacks.

To begin with, the adaptor has a 12 cm outer diameter. Thus, if the adaptor is distributed with an 8 cm disc, the overall package size would need to be at least 12 cm in diameter, or that of a standard CD case (e.g., so-called "jewel box"). It also requires excess handling of the 8 cm disc and the possibility of disengagement of the adaptor from the disc resulting in damage to the disc or the disc drive.

Eihaus, U.S. Pat. No. 4,889,330, issued Feb. 6, 1990, Published EP application 0,331,389, published Sep. 6, 1989, and EP Patent Specification 0,391,638 published Apr. 19, 1995, all disclose similar CD adapters for adapting an 8 cm CD to a 12 cm format. However, all of those devices appear to suffer from the same fundamental limitations of the Yamamori device. In particular, the overall size of such adapters precludes them from being packaged into a package substantially smaller than a standard 12 cm CD-ROM. Moreover, such devices appear to physically attach to the CD-ROM itself.

Yamashita et al., U.S. Pat. No. 5,457,677, issued Oct. 10, 1995, discloses an adaptor for a smaller CD for use in a multi-CD adaptor. The device grips the smaller CD which is then removed from the adaptor laterally by the playback apparatus. Such a device may not be readily adaptable to a tray-type CD-ROM player or the like.

Typical CD-ROM drives with opening trays may be provided with a depressed inner portion which may be used to center an 8 cm CD-ROM. Once the CD-ROM is placed in this depression, and the tray closed, the spindle of the CD-ROM drive may engage the center hole of an 8 cm CD-ROM successfully and the 8 cm CD-ROM may be read. Without such a depression, the 8 cm CD-ROM may slide about when the tray is closed, and the spindle may not properly engage, possibly damaging or scratching the 8 cm CD-ROM.

While such a solution may work for an 8 cm CD-ROM, it may not work for other, odd sizes. Given the large installed base of CD-ROM drives, one wishing to distribute a non-standard (e.g., diameter other than 8 cm or 12 cm) CD-ROM size, one cannot expect users to buy new CD-ROM drives with yet a second depression for yet another size CD-ROM.

SUMMARY OF THE INVENTION

In a first embodiment, the present invention may utilize a small compact disc, smaller than the standard 12 cm diameter CD, that will fit inside a card shaped container (if desired). In accordance with the invention, a CD Card device for packaging digital information in a medium as widely accepted and easily carried as a business, credit or collectors card that can be read (or read and written to by drives and disc types so capable) by standard CD drives comprises a small compact disc. This small compact disc is smaller than the standard 12 cm in diameter compact disc commonly used today and the 8 cm compact disc referred to in the Background of the Invention Section above.

The small compact disc of the present invention uses the same technology (materials, and data standards) as does the standard 12 cm diameter CD with the only significant exception being its outside diameter (in a first and third embodiments) or its shape (in a second embodiment). Also, weight may be added to the small compact disc of either embodiment by adding heavier materials and/or increasing the thickness of some outer areas.

The small CD of the present invention may store any data that is stored on a standard 12 cm compact disc, and be read or read and written to if so designed, like any standard 12 cm disc so capable. This is possible because all critical information to allow the proper use of a CD is carried in the innermost part of the area that carries information. Such information falls within the diameter of the small compact disc of the invention. The small compact disc of the invention requires only proper placement in the standard CD drive to perform properly.

The first and third embodiments of the present invention may require an adaptor to ensure proper placement. This adaptor is discussed in the following paragraph. The second (and preferred) embodiment of the invention may not require an adaptor to assure proper placement. Both small compact discs, one embodiment of which may be approximately 5.5 to 6.35 cm in diameter in the case of the first and third embodiments and the other having an approximate width of 5.5 to 6.35 cm and a length of 8 cm in the case of the second (and preferred) embodiment, will have less storage capacity than the standard 12 cm in diameter compact disc.

An adaptor is designed for use with the first and third embodiments of the present invention. The adaptor is designed to position the small compact disc of the first and third embodiments correctly so that it will be accepted by the CD drive. The adaptor is also stored within the card shaped container. One embodiment of the adaptor may stretch across (over) the 8 cm disc aligning circle (available with tray loading CD drives), being kept in position by protruding arc shaped ridges. In this position it will align the small compact disc for proper use.

First, the adaptor is placed in the CD drive tray, then the small compact disc is placed within it. The adaptor will remain in its initial position in the tray as the small compact disc is lifted out of it by the drive mechanism for use. The small compact disc will be returned to the adaptor by the drive mechanism when the small compact disc is no longer in use.

The small compact disc of the second embodiment (and preferred) of the present invention, when placed in the tray, will be in the proper position as a result of its shape.

A card shaped container may hold the small compact disc in a manner to protect it from the casual handling that is common to business, credit and collector cards, the type of handling that could damage a compact disc. It also may hold the adaptor (in the first and third embodiments) used to position the small compact disc. The container permits removal and replacement of the small compact disc (and the adaptor, in the first and third embodiments) from within the card. The card may be designed to display information similar to a credit, business or collectors card on its surfaces.

In its preferred embodiment the CD card may be offered as a digital collectors card, for example a baseball, football, or basketball card. It may also be offered as a digital card displaying the common sights at vacation areas to remind vacationers of their trip while using their computer. One way in which the information may be displayed is in the format of a screen saver. The card may also be used as would a conventional business card but with the added dimension of conveying large amounts of digital information to its recipient. There are many possible uses for the CD Card only some of which are described here.

It is known that in a small percentage of CD drives (less the 5%) a larger adaptor for the first and third embodiments or a newly designed adaptor for the second embodiment may be needed. If it is desired that the smaller compact discs be read in those CD drives, a special larger adaptor may be provided.

BRIEF DESCRIPTION OF THE DRAWINGS

In order that the invention may be readily carried into effect, it will now be described with the accompanying drawings wherein.

DETAILED DESCRIPTION OF THE INVENTION

Figure 1:
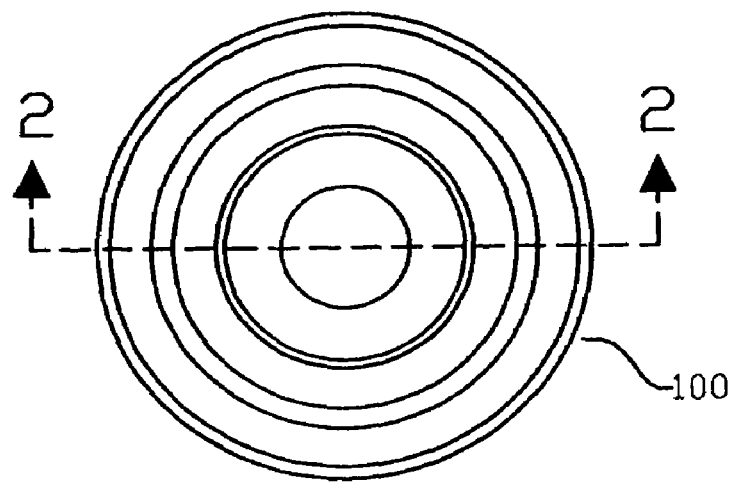
FIG. 1 is a top plan view of a first embodiment of the small compact disc of the present invention.

FIG. 1 is a top plan view of a first embodiment of the small compact disc of the present invention. Disc 100 uses the same technologies, materials, and data standards as does the standard 12 or 8 cm CD, with the only significant exception being that its outside diameter is substantially smaller than a typical prior art 8 or 12 cm compact disc. In the preferred embodiment, the disc is approximately 5.5 to 6.35 cm in diameter.

Figure 2:
FIG. 2 is a cross-section view taken along lines 2—2 of FIG. 1.

FIG. 2 is a cross-section taken along lines 2—2 of FIG. 1, illustrating a cross-sectional view of disc 100.

Figure 3:
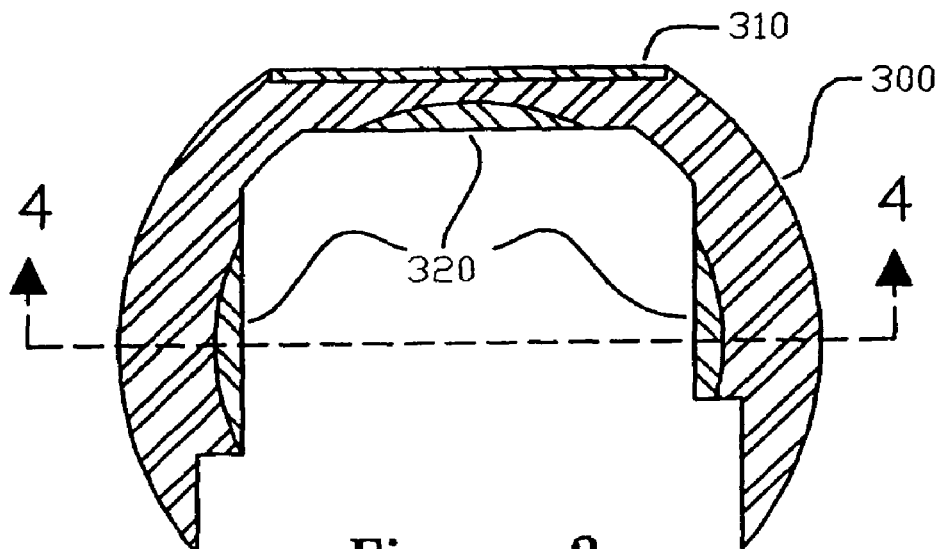
FIG. 3 is a top plan view of a first embodiment of the adaptor of the present invention.

FIG. 3 is a top plan view of an adaptor of the first embodiment of the present invention. Adaptor 300 may be substantially "C"-shaped having an outer diameter of approximately 8 cm. Adaptor 300 may be provided with lands 320 which may be adapted to received the disc 100 when it is placed upon lands 320. Adaptor 300 may also be provided with a ridge 310, the function of which will be described below.

Note that adaptor 300, although adapted to approximately 8 cm disc circle, maintains an overall form factor of approximately 8 cm by 6 cm, allowing it to be packaged in a credit card, business card, or collectible card type packaging. Note that in the case of a business card embodiment, a slightly larger than normal business card size may be required in order to provide sufficient width for data tracks beyond the width of the center hole.

Figure 4:
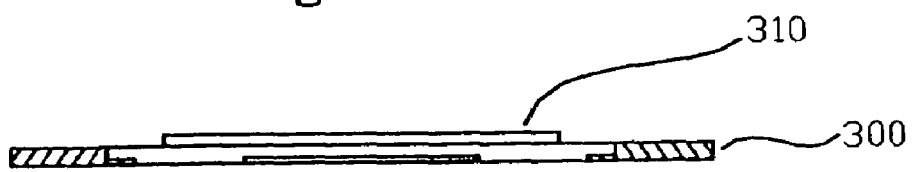
FIG. 4 is a cross-section view taken along lines 4—4 of FIG. 3.

FIG. 4 is a cross-section of adaptor 300 taken along lines 4—4 of FIG. 3. In use, disc 100 may be placed upon lands 320 and the entire combination of adaptor 300 and disc 100 placed into a CD-ROM drive. Adaptor 300 will rest in the depression of the CD-ROM drive designed for an 8 cm disc. Note that disc 100 merely rests upon lands 320 and lands 320 do not in any way necessarily engage or grip disc 100. Once the tray of the CD-ROM drive is closed, the spindle will pick up disc 100 from its resting surface on lands 320. Adaptor 300 will remain in the depression formed in the CD-ROM drive after disc 100 has been picked up and engaged by the CD-ROM drive.

When the tray to the CD-ROM drive is opened, the spindle of the CD-ROM drive will lower disc 100 back onto adaptor 300 and the drive door will open. Without the use of adaptor 300, the disc may fall through the center portion of the drive or become jammed.

Figure 5:
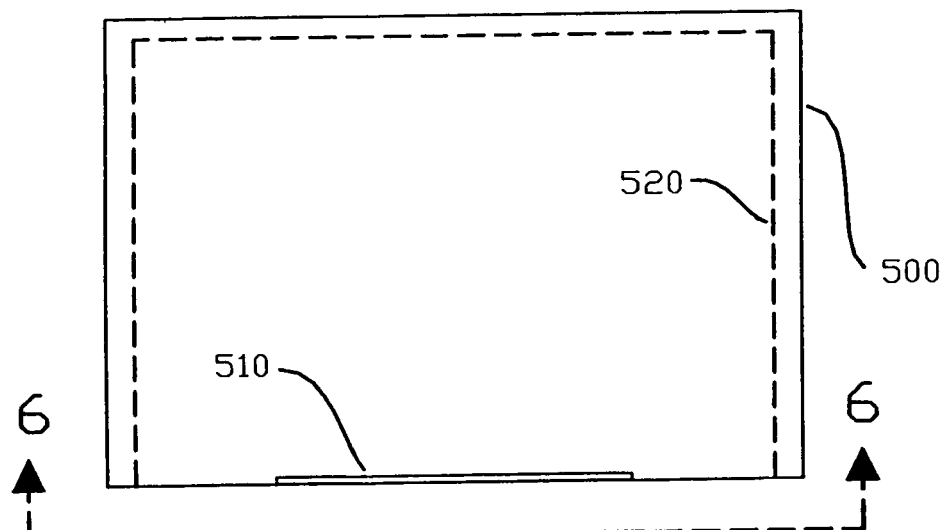
FIG. 5 is a top plan view of a first embodiment of the card shaped container of the present invention.

FIG. 5 is a top plan view of a first embodiment of the present invention of the card shaped container 500. Card shaped container 500 may be suitably formed from transparent plastic or the like to allow a user to view the contents including any materials imprinted on disc 100. Alternately, card shaped container 500 may be formed from opaque or translucent plastic and/or have indicia printed thereon or printed on labels applied to the card. Card shaped container 500 may have an interior opening 520 along with a slot portion 510 which function will be described below.

Figure 6:
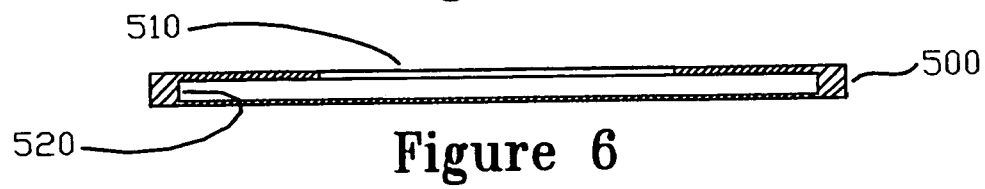
FIG. 6 is a cross-section view taken along lines 6—6 of FIG. 5.

FIG. 6 is a cross-section of the card shaped container 500 taken along lines 6—6 of FIG. 5.

Figure 7:
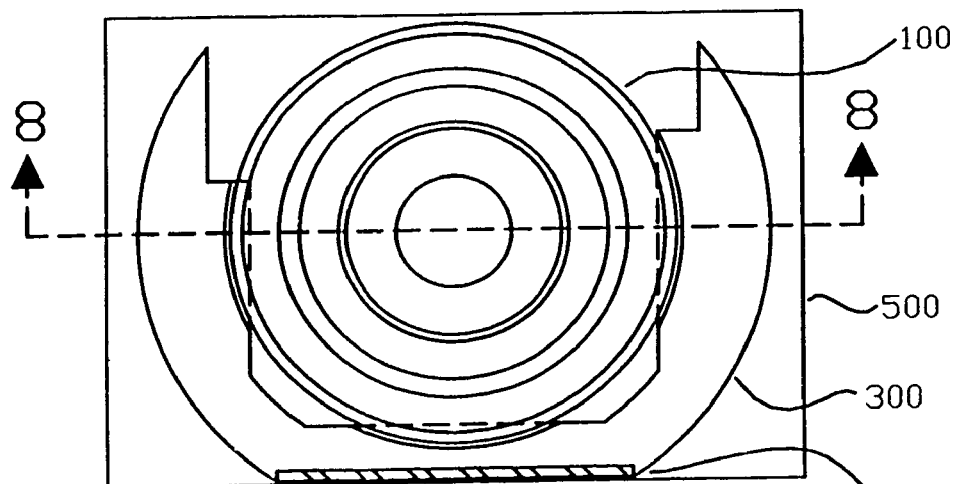
FIG. 7 is a top plan view of the first embodiment of the present invention of the card shaped container with the adaptor and small compact disc carried inside.
Figure 8:
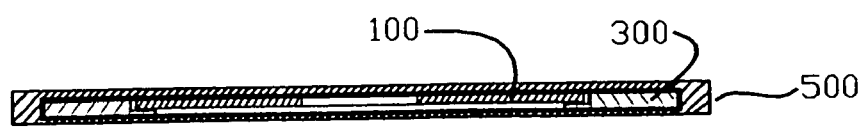
FIG. 8 is a cross-section view taken along lines 8—8 of FIG. 7.

FIG. 7 is a top plan view of the first embodiment of the present invention of the card shaped container 500 with adaptor 300 and small compact disc 100 carried inside. FIG. 8 is a cross-section taken along lines 8—8 of FIG. 7. As illustrated in FIGS. 7 and 8, the combination of disc 100 and adaptor 300 may be suitably slid into card shaped container 500. Note that in FIG. 7, the top portion of card shaped container 500 is not shown for purposes of illustration. Ridge 310 slides within slot portion 510 in such a manner as to allow a user to easily slide out adaptor 300 and disc 100 from card shaped container 500.

It should be noted from FIGS. 7 and 8 that, unlike the prior art, the present invention provides a means by which a smaller disc along with an adaptor may be packaged together into a smaller form factor package. Thus, a user need not purchase an additional bulkier adaptor which does not fit into the business card or baseball card form factor. Moreover, the use of a circular disc eliminates any wobble, imbalance, and aerodynamic problems present in prior art rectangular discs.

Figure 9:
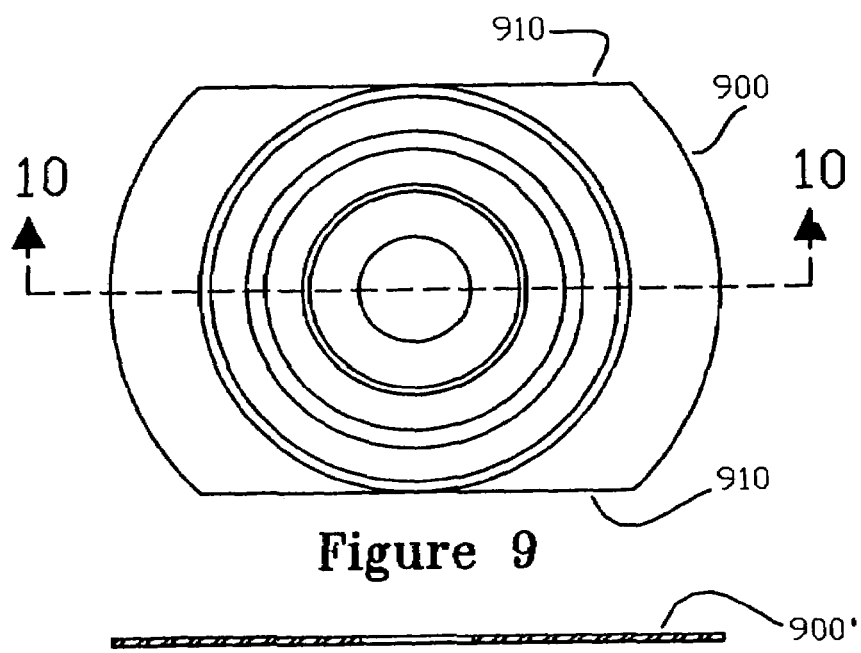
FIG. 9 is a top plan view of a second (and preferred) embodiment of the small compact disc of the present invention.

FIG. 9 is a top plan view of a second embodiment of the present invention of a small compact disc 900. Disc 900 may be provided with a nominal diameter of approximately 8 cm, but having substantially parallel portions 910. The distance between substantially parallel portions 910 may be approximately 5.5 to 6.35 cm. Data may be written into that portion of the disc having a diameter less than the distance between substantially parallel portions 910. Although disc 900 is not round (as with disc 100), unlike prior art rectangular discs, disc 900 is smaller with a greater percentage of the edge of the disc being circular and thus making it more aerodynamic, easier to balance, and simpler to align in the depressed portion (8 cm diameter circle) of the compact disc reader tray. Disc 900 may optionally be provided with balancing weights (not shown) in the form of denser or thicker portions which may serve to dynamically balance disc 900.

Figure 10:
FIG. 10 is a cross-section view taken along lines 10—10 of FIG. 9.

FIG. 10 is a cross-section taken along lines 10—10 of FIG. 9.

Figure 11:
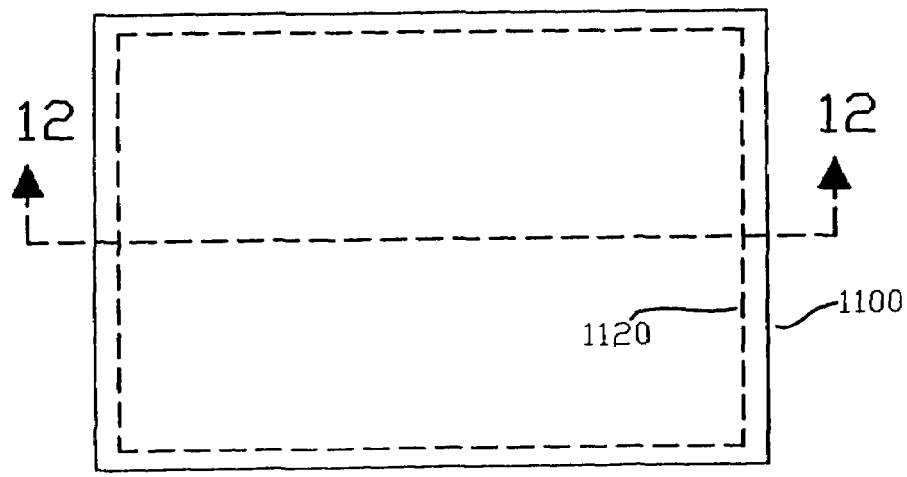
FIG. 11 is a top plan view of a second embodiment of the card shaped container of the present invention.

FIG. 11 is a top plan view of a second embodiment of the present invention of the card shaped container. Card shaped container 1100 may be provided with an internal portion 1120.

Figure 12:
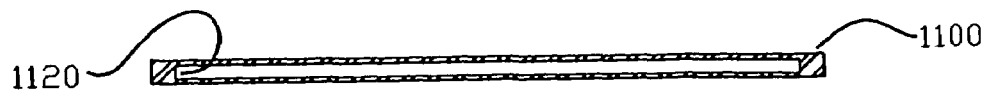
FIG. 12 is a cross-section view taken along lines 12—12 of FIG. 11.

FIG. 12 is a cross-section taken along lines 12—12 of FIG. 11, illustrating the internal portion 1120 of card shaped container 1100. Although not illustrated in FIGS. 11 and 12, card shaped container 1100 may be provided with an opening at one end, or in the alternative, the top portion may slide open or may be hinged to open much as in a typical prior art CD-ROM "jewel box" case.

Figure 13:
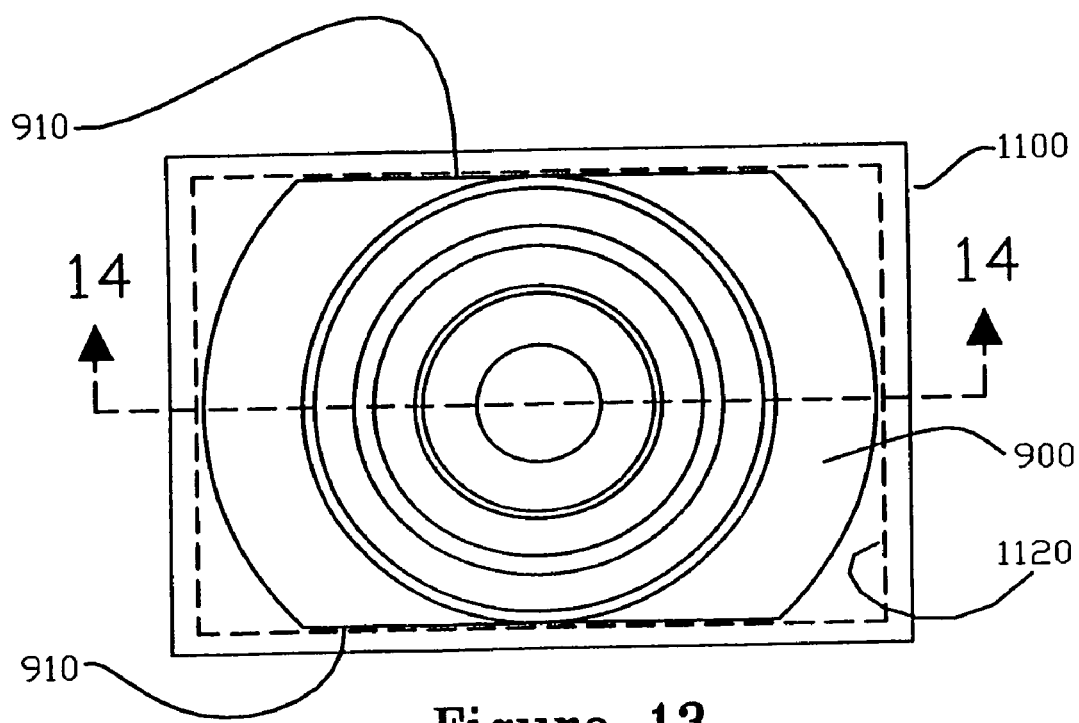
FIG. 13 is a top plan view of a second embodiment of the present invention of the card shaped container with the small compact disc carried inside.

FIG. 13 is a top plan view of a second embodiment of the present invention of the card shaped container with the small compact disc carried inside. As illustrated in FIG. 13, disc 900 may be placed within the internal portion 1120 of card shaped container 1100. Card shaped container 1100 may be provided with an open portion approximately 5.5 to 6.35 cm by 8 cm so as to allow disc 900 to fit therein.

Figure 14:
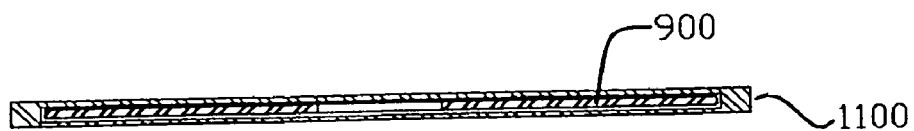
FIG. 14 is a cross-section view taken along lines 14—14 of FIG. 13.

FIG. 14 is a cross-section taken along lines 14—14 of FIG. 13, illustrating a cross-section of the combined apparatus.

Figure 15:
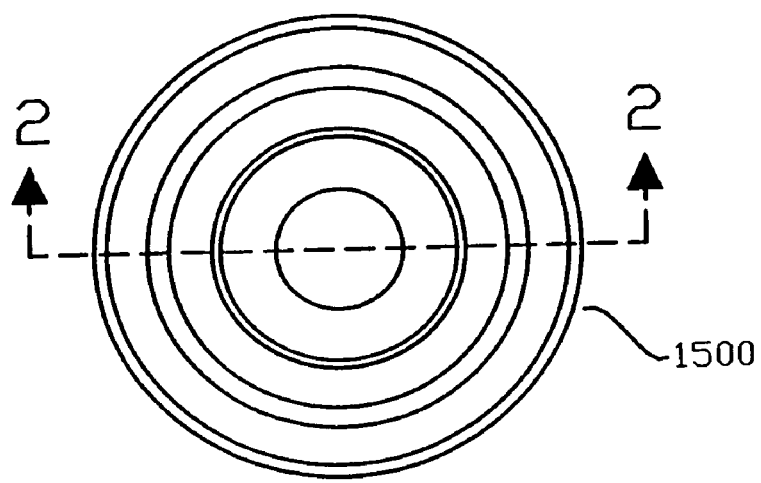
FIG. 15 is a top plan view of a third embodiment of the small compact disc of the present invention.

FIG. 15 is a top plan view of a third embodiment of the present invention of the small compact disc. Disc 1500 is similar for all intents and purposes as disc 100 of FIG. 1.

Figure 16:
FIG. 16 is a cross-section view taken along lines 2—2 of FIG. 15.

FIG. 16 is a cross-section taken along lines 2—2 of FIG. 15.

Figure 17:
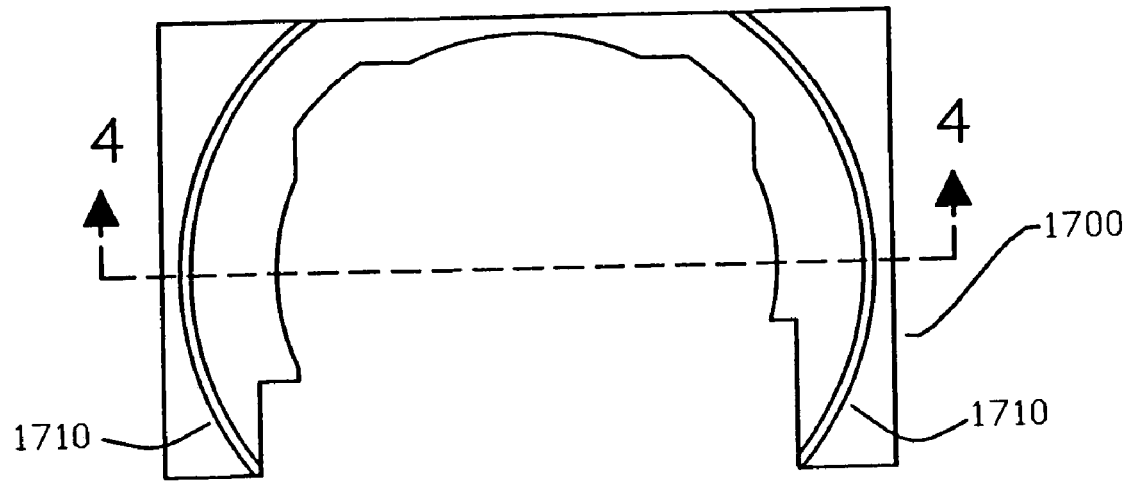
FIG. 17 is a top plan view of a third embodiment of the present invention illustrating an adaptor.

FIG. 17 is a top plan view of the third embodiment of the present invention illustrating an adaptor. The adaptor of FIG. 17 differs slightly from that of FIG. 3 in that the overall adaptor does not have rounded edges. Rather, raised edges 1710 are provided at a diameter approximately 8 cm across the center of adaptor 1700. Raised edges 1710 may rest inside a depressed portion of a CD-ROM drive designed to accommodate 8 cm discs. Disc 1500 may be carried on adaptor 1700 on lands, such as lands 320 shown in FIG. 3. In the alternative, adaptor 1700 may merely center disc 1500 and thus not actually carry or be in contact with disc 1500.

Figure 18:
FIG. 18 is a cross-section view taken along lines 4—4 of FIG. 17.

FIG. 18 is a cross-section taken along lines 4—4 of FIG. 17, illustrating the shape of raised edges 1710.

Figure 19:
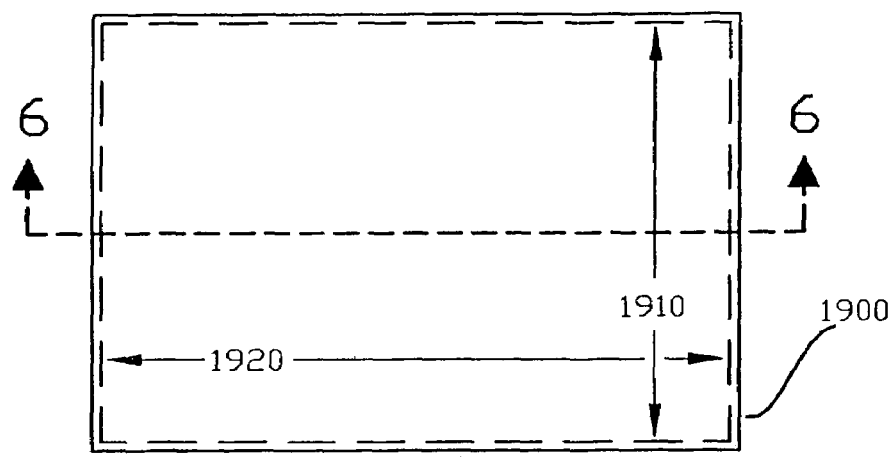
FIG. 19 is a top plan view of a third embodiment of the card shaped container of the present invention.

FIG. 19 is a top plan view of a third embodiment of the present invention of the card shaped container. Card shaped container 1900 may be provided with an internal portion having dimensions 1910 and 1920 being approximately 5.5 to 6.35 cm and 8.5 cm respectively.

Figure 20:
FIG. 20 is a cross-section view taken along lines 6—6 of FIG. 19.

FIG. 20 is a cross-section taken along lines 6—6 of FIG. 19.

Figure 21:
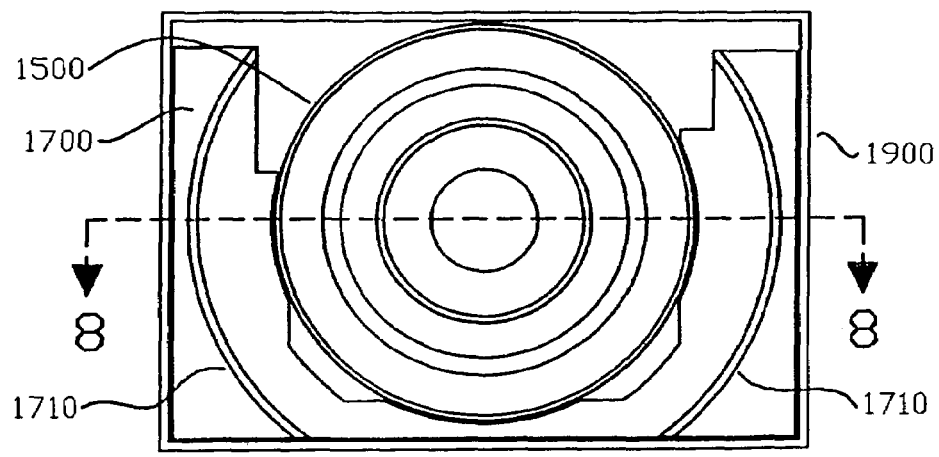
FIG. 21 is a top plan view of the third embodiment of the present invention illustrating the card shaped container with the adaptor and small compact disc carried inside.

FIG. 21 is a top plan view of a third embodiment of the present invention illustrating the card shaped container with the adaptor and small compact disc carried inside. As illustrated in FIG. 21, card shaped container 1900 is sized so as to hold both adaptor 1700 and disc 1500 compactly therein. Again, although not illustrated in the Figures, card shaped container 1900 may be provided with an opening top or side portion to allow disc 1500 and adaptor 1700 to slide out or be removed.

Figure 22:
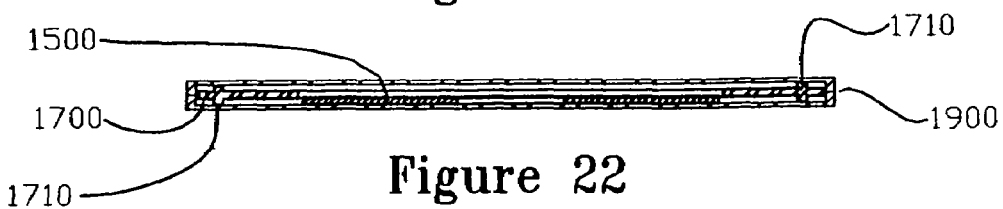
FIG. 22 is a cross-section view taken along lines 8—8 of FIG. 21.

FIG. 22 is a cross-section view taken along lines 8—8 of FIG. 21.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A combined compact disc and container for use as a business, credit or collectors card, comprising:
    a compact disc having a diameter between substantially 8 centimeters and less than 12 centimeters,
    a rectangular card-shaped container having a minor axial dimension substantially the same as the diameter of the compact disc, for receiving and storing the compact disc, and
    a substantially planar adapter, having first raised arcuate ridges on one side thereof, the raised arcuate ridges having a diameter substantially the same as the 8 cm depressed portion of a compact disc reader tray, the substantially planar adapter having internal portions extending inwardly from the first raised arcuate ridge for aligning the compact disc in a compact disc reader, the substantially planar adapter having a minor axial dimension substantially the same as the minor axial dimension of the rectangular card-shaped container so as to fit inside the rectangular card-shaped container with the compact disc contained therein, the substantially planar adapter further having an arcuate outside portion so as to rest upon the compact disc reader tray.

2. The combined compact disc and container of claim 1, wherein the arcuate outside portion of the substantially planar adapter has a diameter of approximately 8 centimeters.

3. The combined compact disc and container of claim 1, wherein said substantially planar adapter further comprises:
    second raised arcuate ridges formed on an opposite side of the substantially planear adapter as the first raised arcuate ridges.

4. A data storage apparatus for distribution as a business card, credit card, or collector card, the data storage apparatus comprising:
    an optically encoded compact disc having a diameter between substantially 8 centimeters and less than 12 centimeters, and
    a substantially planar adapter, having first raised arcuate ridges on one side thereof, the raised arcuate ridges having a diameter substantially the same as the 8 cm depressed portion of a compact disc reader tray, the substantially planar adapter having internal portions extending inwardly from the first raised arcuate ridge for aligning the compact disc in a compact disc reader, the substantially planar adapter having a minor axial dimension substantially the same as the minor axial dimension of a rectangular card-shaped container so as to fit inside the rectangular card-shaped container with the compact disc contained therein, the substantially planar adapter further having an arcuate outside portion so as to rest upon the compact disc reader tray.

5. The data storage apparatus of claim 4, wherein the diameter of the arcuate outside portion of the substantially planar adapter is substantially 8 centimeters.

6. The data storage apparatus of claim 5, wherein the rectangular card-shaped container has a minor axial dimension substantially the same as the diameter of the optically encoded compact disc, for receiving and storing the optically encoded compact disc.

* * * * *